Oct. 25, 1955

H. GANG 2,721,698

TABULATION CONTROL MEANS

Filed Jan. 15, 1953

INVENTOR
HERMAN GANG
BY George V. Hall
ATTORNEY

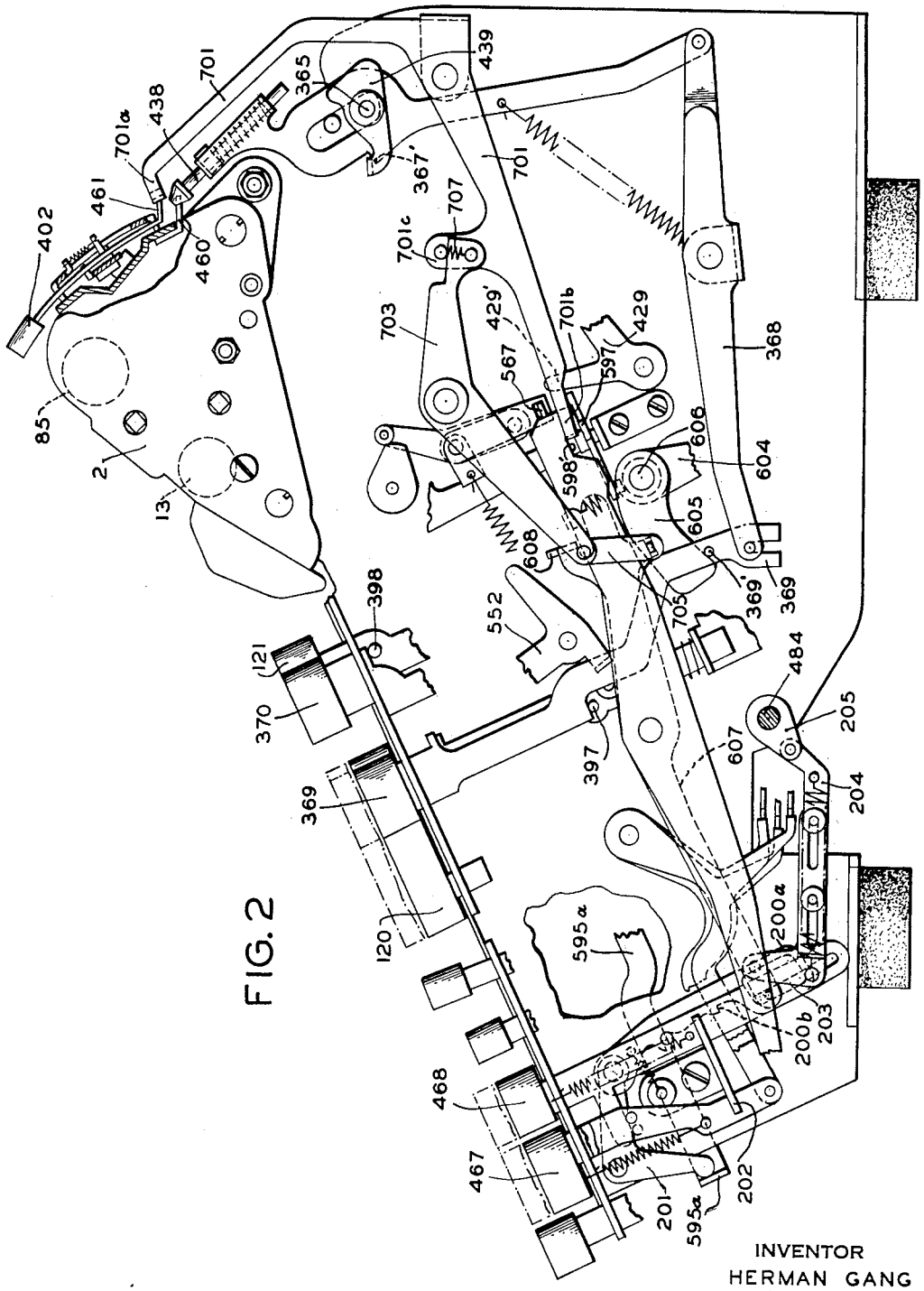

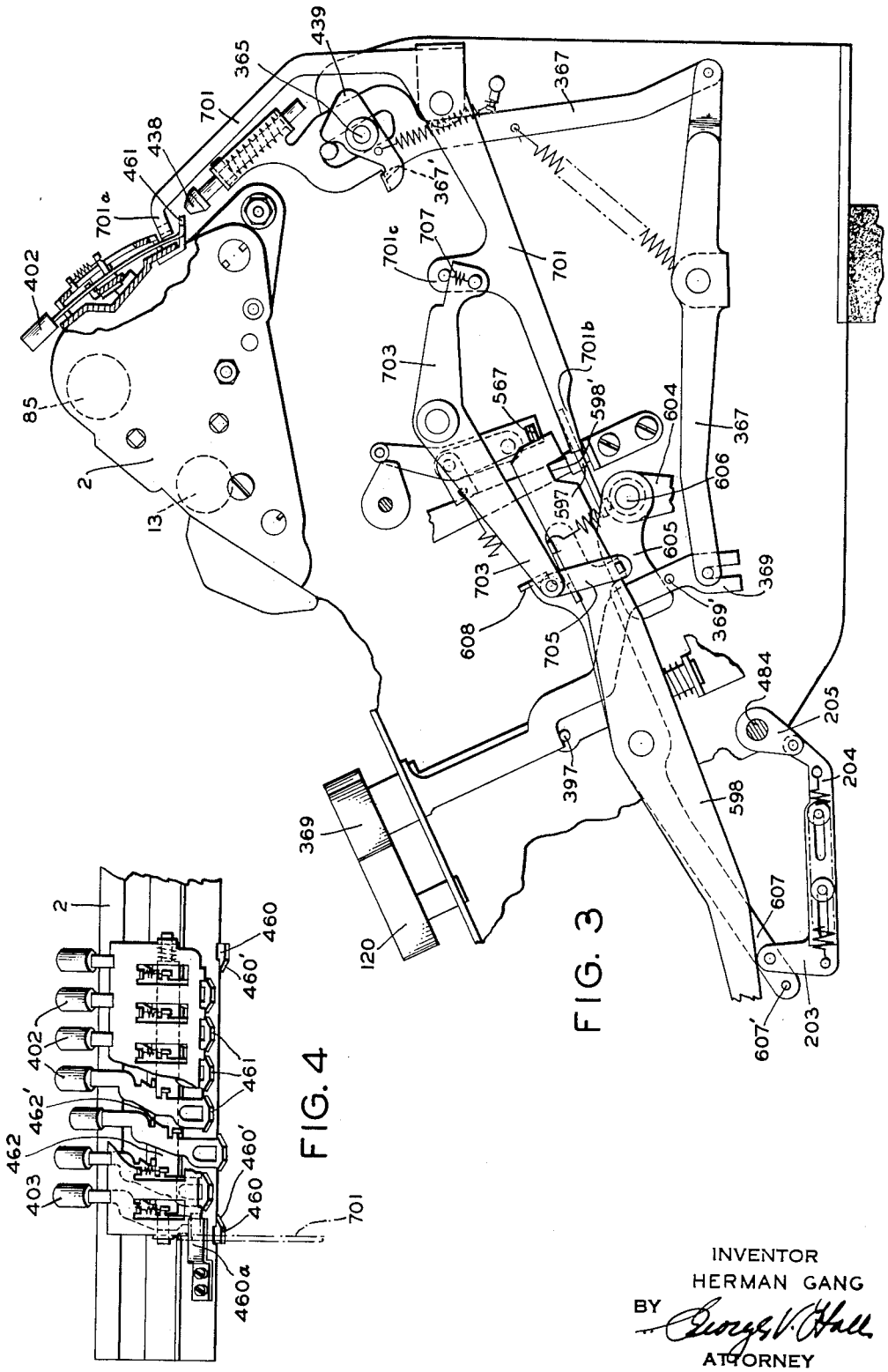

Oct. 25, 1955     H. GANG     2,721,698
TABULATION CONTROL MEANS
Filed Jan. 15, 1953     4 Sheets-Sheet 4
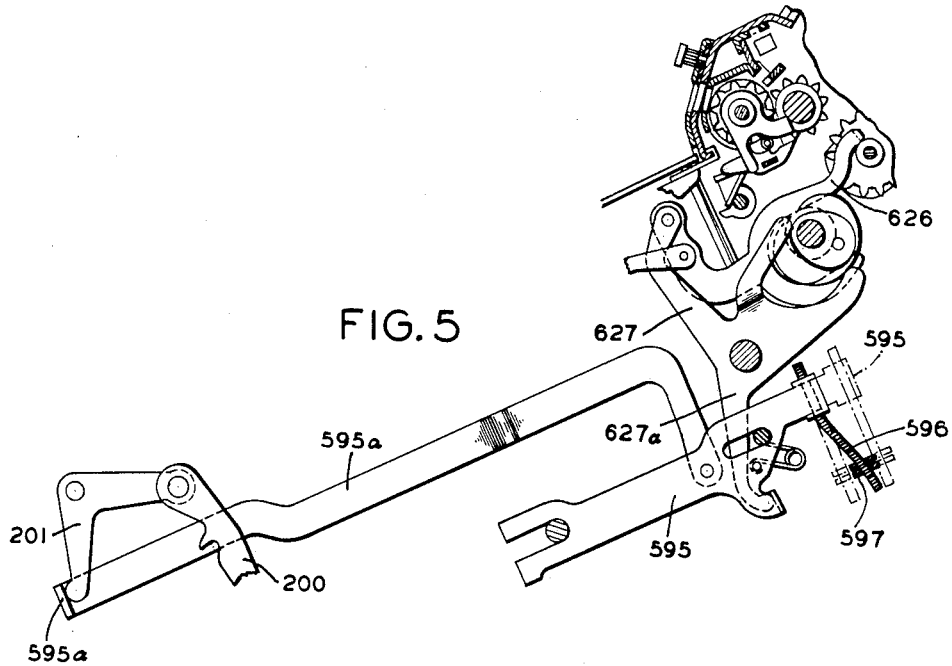
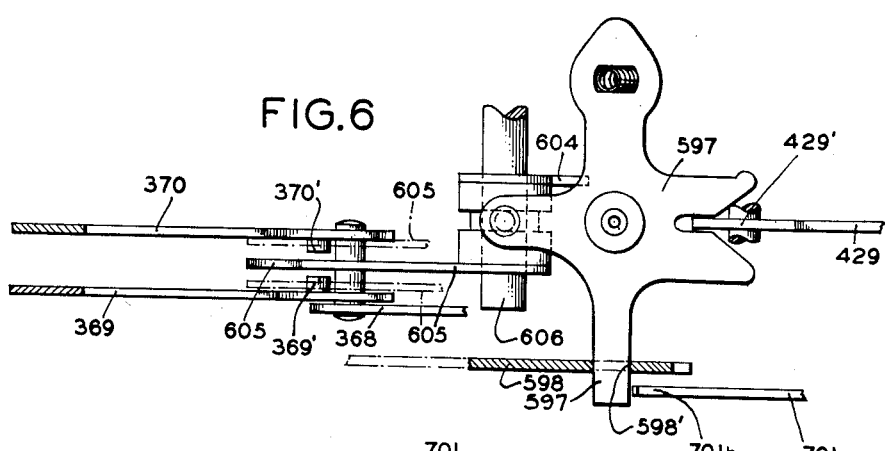
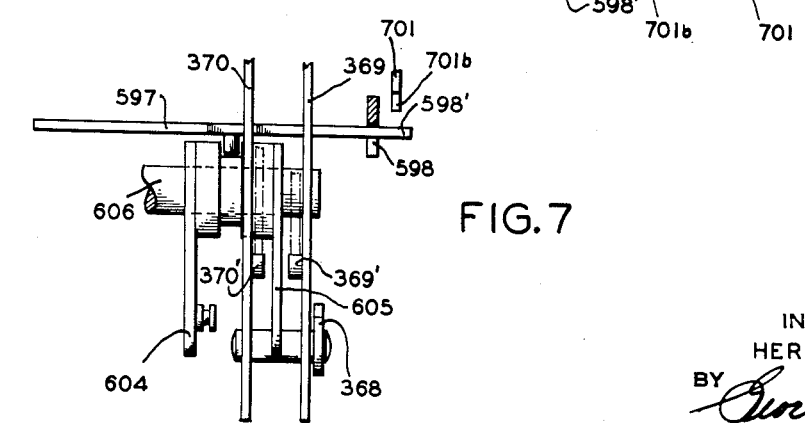
INVENTOR
HERMAN GANG
BY *George V. Hall*
ATTORNEY

United States Patent Office 2,721,698
Patented Oct. 25, 1955

2,721,698

TABULATION CONTROL MEANS

Herman Gang, Livingston, N. J., assignor to Monroe Calculating Machine Company, Orange, N. J., a corporation of Delaware Application January 15, 1953, Serial No. 331,469

5 Claims. (Cl. 235—63)

The invention relates to carriage position control means for calculating machines and more particularly to such means including means for tabulating a shiftable register carriage to a selected denominational position.

In the performance of certain calculations, it is necessary to tabulate the carriage to a selected denominational position to properly relate the factors of the problem before the institution of the operation. As disclosed in applicant's Patent No. 2,531,206, issued on November 21, 1950, a dividend set-up control means is operable first to shift the register carriage of a calculating machine rightwardly to a given denominational position and then to enter a dividend value set on the keyboard into the product dividend register. The carriage shift will be terminated in the right end position; or if the calculation is to be performed with relation to a fixed decimal, the shift will be terminated in an intermediate position corresponding to a set tabular key as disclosed in the above noted patent. However, the carriage may be in the position corresponding to the set tabular key. This location of the carriage may be the result of operation upon depression of a carriage shift key, or it may be the result of a previous calculation such as a multiplying operation with carriage shift return in accordance with the disclosure of applicant's Patent No. 2,531,207, issued on November 21, 1950. In this event, operation of the divident set-up means will result in a carriage shift out of the desired position.

To prevent the above undesired shifting operation, the devices of the present invention provide means which, if the carriage is in the position corresponding to a set tabular key, will disable the carriage shift initiating means which would normally be operable upon operation of the dividend set-up control devices. The dividend set-up operation will, therefore, be effected with the carriage in the desired position. However, all other machine operations will be unaffected by the devices of the invention and will be performed in normal manner with relation to the tabulating means.

Other advantages of the invention will appear from the following description of a preferred embodiment thereof when read in conjunction with the accompanying drawings wherein reference numerals applied to certain parts designate like parts in the aforenoted patents to which reference is made for details of mechanism not herein disclosed.

In the accompanying drawings:

Fig. 1 is a right side elevation of the machine embodying the invention and with the parts in normal position.

Fig. 2 is a right side elevation similar to Fig. 1 with the parts in an operated position and with certain of the parts broken away or omitted.

Fig. 3 is a fragmentary side elevation showing the parts in another operated position.

Fig. 4 is a fragmentary rear elevation of the tabular keys.

Fig. 5 is a fragmentary side elevation of the shift direction control means.

Fig. 6 is a detail top plan view of the shift direction control rocker and the shift initiating member.

Fig. 7 is a detail view of the parts shown in Fig. 6 as viewed from the left.

Tabulating mechanism

In the calculating machine of the aforenoted patents and in which type of machine the invention is disclosed, the tabulating mechanism is operable only in conjunction with a carriage shift operation initiated upon depression of right shift key 369 or left shift key 370 (Figs. 1 and 2). Keys 369 and 370 are mounted in the machine frame closely adjacent the plus bar 120 and minus bar 121. Right shift key 369 has a shoulder overlying a stud 397 carried by the stem of plus bar 120 and left shift key 370 has a shoulder overlying a stud 398 in the stem of minus bar 121, the stems of both keys extending downwardly and having slot and pin connection with the forward end of a lever 368. Pivotally mounted at the rearward end of lever 368 and spring urged toward the front of the machine is an arm 367 having a shoulder 367' intermediate its ends and at the upper free end thereof a plunger 438, the function of which will be later described. Fixed on a shaft 365 extending through the frame of the machine is a latch lever 439 the forward end of which is bent over and normally overlies shoulder 367' of arm 367.

Depression of right shift key 369 will therefore effect depression of plus bar 120 which depression would normally cause additive operation of the registering mechanism, and depression of left shift key 370 will effect depression of minus bar 121 which depression would cause subtractive operation. However, at the same time, depression of either shift key will depress the forward end of lever 368 (Fig. 2) and raise its rearward end with arm 367 to rock lever 439 and shaft 365 clockwise by contact of shoulder 367' with the bent over portion of the lever. Clockwise movement of shaft 365 will result in disengagement of the machine drive with the registering mechanism and its engagement with the carriage shifting mechanism. Upon release of a shift key the parts will be restored thereby effecting counterclockwise movement of shaft 365 which will result in denominational termination of the shift. Reference is made to the aforenoted patents for the details of these operations.

Should the right shift key 369 or the left shift key 370 be held depressed until the carriage is shifted into either of its end positions, shift initiating shaft 365 will be restored whereupon the shift is terminated in the same manner as when the shaft is restored by release of a shift key. For this purpose, two lugs 460 (Figs. 1, 2, and 4) are located on the rear of the carriage 2 and so spaced that the nose of plunger 438 mounted on arm 367 is positioned just below one or the other of the lugs when the carriage is in either of its end positions. Should the carriage be in the right end position, for example, and the left shift key 370 be depressed, the plunger which is spring urged to its normal raised position will be depressed by contact with lug 460 when arm 367 is raised to rock shaft 365 to engage the shifting mechanism. When the carriage has shifted from the right end position, lug 460 will be removed from contact with plunger 438 and said plunger will be spring moved to its raised position. As the carriage is shifted into its left end position, the nose of the plunger will ride outwardly on the inclined edge 460' of lug 460 moving arm 367 to the rear against the tension of its spring. This movement of arm 367 will remove shoulder 367' which through lever 439 rocked shaft 365 to shift initiating position, from restraining engagement with said lever 439 thereby allowing the lever and shaft 365 to be spring moved counterclockwise to normal to terminate the shift. When the shift key is finally released, plunger 438 will drop below lug 460 and arm 367 will be urged forwardly by its spring to locate shoulder 367' in its normal position below the forward end of latch lever 439. Termination of the shift at the opposite end position is, as will readily be understood, accomplished in the same manner.

The tabulating keys 402 (Figs. 1, 2, 3, and 4) one for each denominational order intermediate the right and left end carriage shift positions, are located on the rear of the carriage intermediate the lugs 460 (Fig. 4). The lower end of each key 402 terminates in a lug 461 which is bent outwardly from the carriage at substantially the same angle as the lugs 460, and is provided with a pair of oppositely disposed inclined edges each of which is adapted to displace plunger 438 in the same manner as described in connection with the inclined edges 460' of the lugs 460. In the unset position of the keys 402, the lugs 461 are raised above and out of range of the plunger 438 when a shift key is depressed. However, when one of the keys 402 is depressed, its lug 461 is brought into the same plane as the lugs 460 and should the carriage be shifted either to the right or left into the order corresponding to said key, one or the other of the inclined edges of the lug 461 will act to displace the plunger 438 and terminate the shift in the same manner as described in connection with the lugs 460. When the shift key is finally released, plunger 438 will drop below the lug 461 of the tabulating key 402 as described in connection with the end lugs 460 and the parts will be restored to normal. Should a shift key then be depressed, plunger 438 will yield by engagement with lug 461 of the tabular key and a shift will be initiated as described with the carriage in an end position.

As will be noted in Fig. 4, a depressed key 402 is latched in set position by a lug 462', one of which is provided for each key, on slide 462 which is spring urged to the left. Upon depression of one or the other keys 402 and before it is latched, an inclined edge of the key stem will, by contact with its lug, cam the locking slide 462 to the right allowing the previously set key to be restored by a suitable spring to normal. An additional key 463 is provided which functions in like manner to unset any one of the keys 402 thereby providing for shift to the end positions.

*Dividend entering with selective carriage shift*

The register clearing operations, fully disclosed in Patent No. 2,531,206, are selectively effected upon engagement of a single cycle auxiliary clear clutch (not shown). The clutch is engaged to clear the product-dividend wheels 13 (Figs. 1 and 2) upon depression of a clear key 467, and upon depression of an adjacently positioned clear key (not shown), the clutch is engaged to clear the multiplier quotient dials 85. The clear keys may be depressed conjointly, and thus the clearing operations effected simultaneously. As an incident to the operation of the clear clutch, a shaft 484 is rocked counterclockwise and returned to perform operations hereinafter described.

Conjoint depression of a set-up key 468 with clear key 467 and/or the other register clear key will, if carriage 2 is out of its right end position, normally be operable to cause engagement of the carriage shift mechanism for right shift, and to release spring energized lever 553 which causes operation of the dividend entering operation. Operation of the dividend entering mechanism, however, will be held in abeyance until termination of the carriage shift. A slot at the lower end of the stem of set-up key 468 is intermediately engaged by a pin 607' at the leftmost end of a lever 607 and also pin 607' engages the lower edge of a rectangular opening 200a at the lower end of a latch arm 200. Latch arm 200 is pivotally mounted at its upper end to a rearwardly extending arm of a bell crank 201 which is fulcrumed on the machine frame. Latch arm 200 is spring urged clockwise, thereby normally engaging (Fig. 1) a shoulder 200b thereof with the rear edge of a plate 202. Latch arm 200 normally is held against downward movement by its shoulder 200b engaging plate 202, and pin 607' engaging the lower edge of opening 200a will therefore restrain lever 607 from counterclockwise movement.

A link 203 has pivotal attachment at its left end with lever 607 a slight distance to the rear of pin 607'. A second link 204 has pin and slot connection with link 203 and the two links are normally spring urged together lengthwise to the limit of the slot and pin connection. The right link 204 has pivotal connection with a crank 205 fixed on shaft 484. Therefore, upon depression of either or both of the clear keys and the consequent counterclockwise movement of crank 205, the spring connection between links 203–204 will yield for the reason that pin 607' engaging the edge of opening 200a will hold lever 607 against counterclockwise movement. However, upon depression of set-up key 468 (Fig. 2) a pin 468a on the key stem, which engages a cam surface on the left edge of latch arm 200, will rock said arm counterclockwise, thereby removing shoulder 200b from engagement with plate 202. Latch arm 200 will, therefore, be permitted downward movement, and when crank 205 is rocked (Fig. 3) upon conjoint depression of a clear key, links 203—204 will be effective to rock lever 607. The slot at the end of the stem of key 468 and opening 200a of latch arm 200 will permit lever 607 to be restored by links 203—204 should the key be held depressed (Fig. 2) until the end of the clear out clutch cycle. Furthermore, the stem of setup key 468 has a forwardly extending arm which overlies a pin in the stem of each of the clear keys. Therefore, depression of the setup key will result in conjoint depression of both of the clear keys. The product dividend register will, therefore, be cleared for the dividend entering operation and the multiplier quotient register will be cleared for the subsequent division operation. The above operations result in a rightward carriage shift followed by the dividend entering operation as follows.

A shift direction control slide 595 (Fig. 5) is mounted on the inner side of the right side frame. Slide 595 is adapted for two settings; normally toward the rear of the machine as shown in dot-dash lines and toward the front as shown in full lines and in which positions it is held by a suitable toggle spring. Mounted on the rear and extending downwardly from slide 595 is a tightly wound spring 596. The lower end of spring 596 is not anchored but extends downwardly through a hole located on the end of an inwardly extending arm of a rocker 597. Rocker 597 is pivotally mounted on a bracket which is mounted on the outer face of the right side frame, and its inwardly extending arm which has connection with spring 596 passes through a suitable opening in the side frame. Rocker 597 is adapted to be rocked in a plane substantiall parallel to that of the keyboard, but normally is held in a central or neutral position by a recess 598' (Fig. 1) in the rear under edge of a lever 598 which has common pivotal mounting with lever 607. Lever 598 is spring urged clockwise thereby holding its rear end downwardly to normally engage recess 598' with an outwardly extending arm of rocker 597.

Attached to slide 595 (Fig. 5) is a forwardly extending arm 595a having a lug at its forward free end engaged by the depending arm of bell crank 201. Therefore, upon downward movement of latch arm 200 when lever 607 is rocked, the arm of bell crank 201 engaging the lug of arm 595a will adjust slide 595 to its forward right shift controlling position. Spring 596 will now urge rocker 597 counterclockwise as the spring tends to straighten itself to the position shown to the left in dot-dash lines (Fig. 5.).

Lever 607 is disposed to the rear of lever 598 and has at its rear end a lug 607' (Figs. 1, 2, and 3) which underlies and is normally in contact with the lower edge of lever 598. Thus, when lever 607 is rocked counterclockwise, lever 598 will likewise be rocked, thereby removing recess 598' from engagement with the arm of rocker 597 to release said rocker. Lever 607 is further provided at its rear end with an upstanding arm 608 which is normally positioned just below a rearwardly extending arm of the lower link of toggle 552. Accordingly, when lever 607 is rocked arm 608 will break said toggle and release lever 553 which would normally initiate an operation of the setup mechanism. However, the rear end of lever 598 will be raised into position to block the leftward movement of a lever 567 (Figs. 2 and 3) which would normally result in operation of the setup mechanism. Therefore, the operation is held in abeyance as long as lever 598 is held in blocking engagement with lever 567.

A crank 602 fixed on shaft 484 has yieldable link connection 603 with a depending crank 604 which is integral with a rearwardly disposed hub of an arm 605 (Figs. 6 and 7). The hub of arm 605 is provided with a circumferential slot and is rotatably mounted and adapted for lateral displacement on a stub shaft 606 extending outwardly from the side frame. A pin in the end of a forwardly extending arm of rocker 597 is positioned in the slot of the hub of arm 605. Thus, it will be seen that when rocker 597 is rocked in either direction, arm 605 will be moved laterally either to the right or to the left on shaft 606.

The forward end of arm 605 is normally positioned between and out of contact with pins 369' and 370' which are located in the lower ends of the stems of right and left shift keys 369 and 370 respectively. Thus, normally during a clearout cycle, shaft 484 through crank 602, link 603 and crank 604 will rock arm 605 clockwise to a position above pins 369' and 370' and return without contacting said pins. However, when rocker 597 has been released (Fig. 2) from recess 598' of lever 598 as described, spring 596 (Fig. 5) will move rocker 597 counterclockwise from the position shown in Fig. 6 as arm 605 passes above and between pins 369' and 370'. Therefore, arm 605 will be moved from its mid position into engagement with the stem of right shift key 369 above pin 369', and as arm 605 is restored it will engage the upper side of pin 369' thereby depressing shift key 369 (Fig. 2) to initiate a right carriage shift.

When rocker 597 is moved counterclockwise, the outwardly extending arm thereof will be moved to the right of recess 598' of arm 598. Therefore, when lever 607 is restored (Fig. 2) the lower edge of lever 598 will rest upon the outwardly extending arm of rocker 597. Thus lever 598 will be held in blocking engagement with lever 567 until termination of the carriage shift. The shift will be terminated in the right end position or in a position corresponding to a set tabular key 402. As an incident to the shift terminating operation, an arm 429 (Figs. 1, 2, and 6) will be rocked counterclockwise. Rocker 597 is provided with a cam slot at its rear. As arm 429 is rocked, an extension 429' thereof will enter said slot thereby moving rocker 597 clockwise to its central position. Rocker 597 will, therefore, move arm 605 out of engagement with pin 369' of right shift key 369 thereby releasing the key. Furthermore, the outwardly extending arm of rocker 597 will be moved to the left from the position shown in Fig. 2 into alignment with recess 598' and lever 598 will be spring restored to engage the recess with the arm thereby locking rocker 597 in central position against the tension of spring 596. When lever 598 is restored its rear end will be removed from blocking engagement with the end of lever 567 and, as toggle 552 was broken at the start of the operation, a dividend entering operation will be effected by the setup mechanism. The setup mechanism operates through control of operation of the registering mechanism. During operation of the registering mechanism, a rocker 627 (Fig. 5) is operated to drive a counting finger 626 as fully disclosed in the aforenoted Patent 2,531,207. A finger 627a depending from rocker 627 is adapted to engage a lug on shift control slide 595 upon operation of the rocker when the slide is in forward position, thereby moving the slide to its normal rear position. The shift control means are therefore normally set for left shift in conjunction with a multiplier entering operation.

*Dividend entering with disablement of carriage shift initiating means*

It will be recalled that upon depression (Fig. 2) of setup key 468, lever 598 is rocked to release rocker 597 which then is operable by spring 596 (Fig. 5) to adjust arm 605 for operation in conjunction with a register clearing operation to initiate a right carriage shift. The devices of the invention provide a blocking device which is moved from ineffective position into position to block rocker 597 from operation upon release by lever 598 if the carriage is in an intermediate position corresponding to a set tabular key 402 and thereby prevent shifting of the carriage.

The blocking device comprises a crank 701 (Figs. 1, 2, and 3) pivotally mounted at the rear of the right side frame. An upstanding arm of crank 701 terminates in a nose 701a which, when crank 701 is in normal clockwise position (Figs. 1 and 2) is positioned immediately adjacent the rear of the lug 461 of any unset tabular key 402 if the carriage is in the position corresponding to the key. However, if the tabular key is in depressed set position (Fig. 3) lug 461 will be positioned below nose 701a. A blocking end 701b of a forwardly extending arm of crank 701 normally is positioned above (Figs. 1 and 2) and out of the path of movement of the outwardly extending arm of rocker 597. A lever 703 has link connection 705 at its forward end with lug 607' of lever 607 and is thereby held in normal counterclockwise position with its rear end engaging the under side of a pin 701c of crank 701. A spring 707 normally maintains the engagement of pin 701c with the end of lever 703 to provide a resilient coupling between the lever and crank 701.

First the operation will be considered upon depression of setup key 468 with the carriage in an intermediate position in which a tabular key 402 is in raised or unset position as shown in Figs. 1 and 2. Levers 607 and 598 will be rocked counterclockwise, thereby removing recess 598' (Fig. 2) from restraining engagement with the forwardly extending arm of rocker 597 to release the rocker. Link 705 will rock lever 703 clockwise and yieldable spring connection 707 will urge crank 701 counterclockwise. However, nose 701a, a slight distance to the rear of lug 461 of the unset tubular key (Fig. 2) will engage the lug and crank 701 will be blocked from counterclockwise movement as yieldable spring connection 707 permits the movement of lever 703. Blocking end 701b will, therefore, remain in raised position out of the path of movement of the arm of released rocker 597 and the carriage shift followed by the factor entering operation will be effected as heretofore described. In Fig. 2, lever 607 is shown in restored position which is permitted by the slot in the stem of depressed key 468. The end of lever 703 therefore is shown reengaged with pin 701c after having been permitted movement by spring 707.

Next the operation will be considered with the carriage in the position of a depressed tabular key 402 (Fig. 3) wherein its lug 461 will be lowered out of the counterclockwise path of movement of nose 701a. Upon operation of the parts, as described, spring 707 will be effective to rock crank 701 counterclockwise as nose 701a will be permitted movement above the lug 461 of the set tabular key 402. Therefore, blocking end 701b will be lowered into the path of movement of the arm of rocker 597 and the rocker will be disabled to adjust the mechanism to initiate a carriage shift. When levers 607 and 598 are restored, the end of lever 598 will be removed from engagement with the end of lever 567 and the factor entering operation will be effected without a carriage shift.

Means are provided to permit a right carriage shift if the carriage is in the left end position. Such means comprises a fixed lug 460a (Figs. 1 and 4) above lug 460. Lug 460a is in the horizontal plane of lugs 461 of keys 402 when the keys are in unset position. Nose 701a will, therefore, be blocked and crank 701 will be prevented counterclockwise movement to disable the shift initiating mechanism.

In the machine of the patents herein referred to, levers 607 and 598 are rocked by manual depression of setup key 468, while in the machine in which the invention has been disclosed this operation is performed by power from the clear clutch. Furthermore, in the present disclosure, shift direction control slide 595 is adjusted by means other than disclosed in the reference patents. Operations other than these which cooperatively relate with the operations of the mechanisms of the invention are performed as fully disclosed in the reference patents.

It will be obvious that the invention is applicable to control means to initiate a carriage shift in either direction. For example, the forwardly extending arm of crank 701 could be lengthened and a recess provided at its lower edge adapted to engage the arm of rocker 597 to prevent its adjustment in either direction. Furthermore it will be obvious that the invention is not limited to the control of shift initiating means in conjunction with the particular carriage shifting mechanism nor to the particular machine operation herein disclosed. The invention, therefore, is to be restricted only by the spirit of the appended claims.

I claim:

1. In a motor driven calculating machine having a shiftable carriage, mechanism for denominationally shifting said carriage, and means operable to terminate operation of said shifting mechanism; the combination with means operable to initiate operation of said shifting mechanism, and a plurality of settable tabular keys including a blocking member each corresponding to a denominational position and each operable in set position to initiate operation of said shift terminating means upon movement of said carriage into the position corresponding thereto; of a device operable to disable said shift initiating means and blocked from operative movement by the blocking member of an unset tabular key when said carriage is in the position corresponding thereto.

2. In a motor driven calculating machine having a shiftable carriage, mechanism for denominationally shifting said carriage, and means operable to terminate operation of said shifting mechanism; the combination with a member operable to initiate operation of said shifting mechanism and adjustable from ineffectively operable to effectively operable position, control means operable to cause operation of said shift initiating member and its adjustment from ineffectively operable to effectively operable position, and a plurality of settable tabular keys each corresponding to a denominational position and each operable in set position to initiate operation of said shift terminating means upon movement of said carriage into the position corresponding thereto; of a device operable when said carriage is in the position corresponding to a set tabular key to disable said control means to adjust said shift initiating member to effectively operable position.

3. In a motor driven calculating machine having a shiftable carriage, mechanism for denominationally shifting said carriage, and means operable to terminate operation of said shifting mechanism; the combination with a member operable to initiate operation of said shifting mechanism and adjustable from ineffectively operable to effectively operable position, control means operable to cause operation of said shift initiating member including an adjusting member for moving said shift initiating member from ineffectively operable to effectively operable position and a plurality of settable tabular keys each corresponding to a denominational position and each operable in set position to initiate operation of said shift terminating means upon movement of said carriage into the position corresponding thereto; of a device operable when said carriage is in the position corresponding to a set tabular key to block said adjusting member from moving said shift initiating member to effectively operable position.

4. In a motor driven calculating machine having a shiftable carriage, mechanism for denominationally shifting said carriage, and means operable to terminate operation of said shifting mechanism; the combination with a member operable to initiate operation of said shifting mechanism and adjustable from ineffectively operable to effectively operable position, control means operable to cause operation of said shift initiating member including an adjusting member for moving said shift initiating member from ineffectively operable to effectively operable position, and a plurality of settable tabular keys including a blocking member each corresponding to a denominational position and each operable in set position to initiate operation of said shift terminating means upon movement of said carriage into the position corresponding thereto; of a device operable when said carriage is in the position corresponding to a set tabular key to block said adjusting member from moving said shift initiating member to effectively operable position and blocked from said blocking operation by the blocking member of an unset tabular key when said carriage is in the position corresponding thereto.

5. In a motor driven calculating machine having a shiftable carriage, mechanism for denominationally shifting said carriage, and means operable to terminate operation of said shifting mechanism; the combination with a member operable to initiate operation of said shifting mechanism and adjustable from ineffectively operable to effectively operable position, control means operable to cause operation of said shift initiating member including an adjusting member for moving said shift initiating member from ineffectively operable to effectively operable position, and a plurality of settable tabular keys including a blocking member each corresponding to a denominational position and each operable in set position to initiate operation of said shift terminating means upon movement of said carriage into the position corresponding thereto; of a pivotally mounted device having a sensing end and a blocking end normally ineffectively positioned relative to the adjusting member for the shift initiating member, resilient means operable by said control means for moving said device to position its blocking end to prevent operation of said adjusting member when said carriage is in a position corresponding to a set tabular key and when said carriage is in a position corresponding to an unset tabular key, said device being prevented from movement by engagement of its sensing end with the blocking member of said key.

References Cited in the file of this patent

UNITED STATES PATENTS

| | | |
|---|---|---|
| 2,377,767 | Dustin et al. | June 5, 1945 |
| 2,636,677 | Gang | Apr. 28, 1953 |